United States Patent [19]
Pearson

[11] Patent Number: 5,661,466
[45] Date of Patent: Aug. 26, 1997

[54] ANGULAR DISPLACEMENT SIGNALLING DEVICE

[75] Inventor: Earl C. Pearson, Knoxville, Tenn.

[73] Assignee: Robertshaw Controls Company, Richmond, Va.

[21] Appl. No.: 384,928

[22] Filed: Feb. 7, 1995

[51] Int. Cl.⁶ .................................................. G08B 21/00
[52] U.S. Cl. ........................................ 340/686; 180/444
[58] Field of Search .......................... 340/686; 180/79.1, 180/DIG. 3, 443–446; 318/652; 73/862.321, 862.325, 862.338; 74/492, 504; 338/13, 47

[56] References Cited

U.S. PATENT DOCUMENTS

| | | | |
|---|---|---|---|
| 2,873,760 | 2/1959 | Safford | 137/529 |
| 3,308,846 | 3/1967 | Yuile | 137/487.5 |
| 3,580,352 | 5/1971 | Hestad et al. | 180/DIG. 3 X |
| 3,983,953 | 10/1976 | Bayle | 180/DIG. 3 X |
| 4,245,667 | 1/1981 | Braukmann | 137/493 |
| 4,485,843 | 12/1984 | Wolff | 137/514 |
| 4,596,271 | 6/1986 | Brundage | 137/540 |
| 4,631,923 | 12/1986 | Smith | 137/522 X |
| 4,656,409 | 4/1987 | Shimizu | 180/79.1 X |
| 4,660,669 | 4/1987 | Shimizu | 180/79.1 |
| 4,676,331 | 6/1987 | Iwaki et al. | 180/79.1 |
| 4,724,711 | 2/1988 | Sakakibara et al. | 180/79.1 X |
| 4,799,506 | 1/1989 | Taylor | 137/469 |
| 4,871,039 | 10/1989 | Daido et al. | 180/79.1 |
| 4,875,367 | 10/1989 | Morishita et al. | 73/862.325 X |
| 4,932,434 | 6/1990 | Taylor | 137/469 |
| 5,029,659 | 7/1991 | Saito | 180/79.1 |
| 5,056,556 | 10/1991 | Nishimoto et al. | 137/522 |
| 5,230,364 | 7/1993 | Leng et al. | 137/514 |

*Primary Examiner*—Thomas Mullen
*Attorney, Agent, or Firm*—Watts, Hoffmann, Fisher & Heinke Co. L.P.A.

[57] ABSTRACT

An angular signalling device comprising a housing, a torque transmitting unit extending through the housing, first and second rotors fixed to respective first and second unit regions for rotation relative to the housing, an output member supported for movement with respect to the housing and the rotors, a transmission for transmitting drive between the output member and the first rotor so that the output member movement bears a predetermined relationship to movement of the first rotor, a first angular displacement signal generator comprising a first signal element fixed with respect to the output member and the second signal element fixed with respect to the housing, the signal elements coupled together and relatively moveable to produce a first angular displacement signal whose value changes in relation to the extent of the relative angular movement between the first rotor and the housing, and a second angular displacement signal generator comprising third and fourth signal elements coupled together to produce a second angular displacement signal having a value which varies in relation to the angular displacement between the first and second rotors.

5 Claims, 4 Drawing Sheets

ANGULAR DISPLACEMENT SIGNALLING DEVICE

FIELD OF THE INVENTION

The present invention relates to signalling devices and more particularly relates to angular displacement signalling devices.

BACKGROUND OF THE INVENTION

Signalling devices have been constructed to indicate the degree of angular displacement between two members. In some cases, devices have been proposed for signalling angular position through multiple revolutions of one member. Such devices sometimes relied on multiple potentiometers, or the like, connected for sequential operation as one member revolved. These were complex, relatively expensive devices. Furthermore such devices were frequently constructed so that calibration was required after the signalling device was connected to the relatively rotatable members. Still further, the prior art devices have not proposed devices for signalling both angular displacement and torque transmission of a rotating member. Devices of the sort referred to can be applied to vehicle steering columns.

SUMMARY OF THE INVENTION

The present invention provides a new and improved angular displacement signalling device which comprises a housing, a torque transmitting unit extending through the housing and rotatable about an axis, a first rotor fixed to a first unit region for rotation relative to the housing, a second rotor fixed to a second unit region for rotation relative to the housing, an output member supported for movement with respect to the housing and the rotors, a transmission for transmitting drive between the output member and the first rotor so that the output member bears a predetermined relationship with movement of the first rotor, a first angular displacement signal generator comprising a first signal element fixed with respect to the output member and the second signal element fixed with respect to the housing, the signal elements coupled together and relatively moveable to produce a first angular displacement signal whose value changes in relation to the extent of the relative angular movement between the first rotor and the housing, and a second angular displacement signal generator comprising third and fourth signal elements coupled together to produce a second angular displacement signal having a value which varies in relation to the angular displacement between the first and second rotors.

Other features and advantages of the invention will become apparent from the following detailed description of a preferred embodiment made with reference to the accompanying drawings.

DETAILED DESCRIPTION OF THE BEST KNOWN MODE OF PRACTICING THE INVENTION

Figure 1:
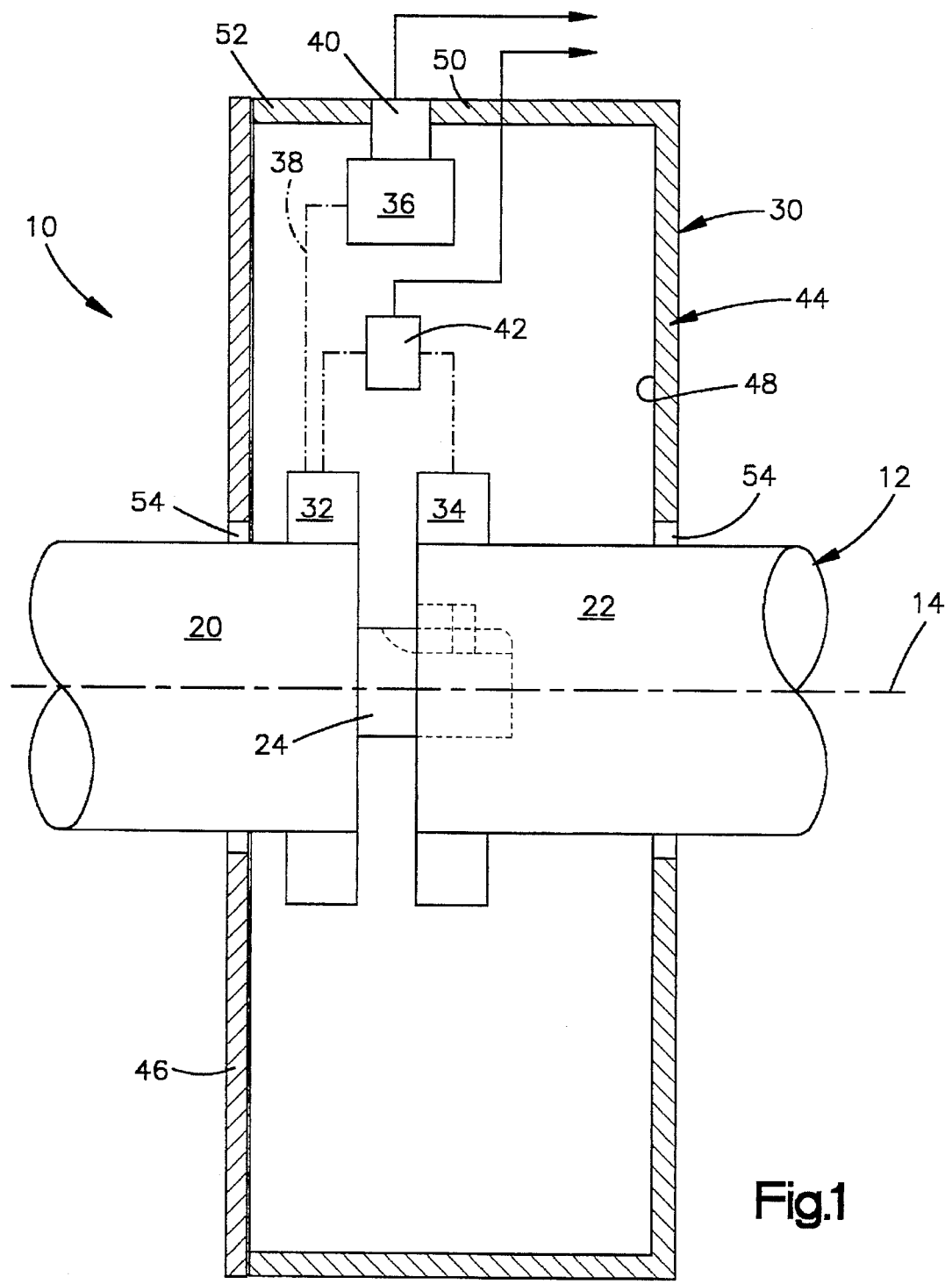
FIG. 1 is a schematic illustration of an angular displacement signalling device embodying the present invention associated with a shaft unit.

An angular displacement signalling device 10 constructed according to the present invention is illustrated schematically by FIG. 1 of the drawings. The device 10 is constructed for association with a torque transmitting unit 12 which is rotatable about an axis 14. The device 10 is so constructed and arranged that it provides output signals indicative of both the angular displacement of the unit 12 as it rotates about the axis 14 and the torque transmitted by the unit 12 at any given time. The unit 12 may form part of a vehicle steering column which is capable of being revolved several times as the vehicle steering wheel is turned from "lock to lock."

Referring to FIG. 1, the unit 12 is schematically illustrated as comprising first and second regions 20, 22 which are spaced axially apart along the unit. The illustrated unit 12 further includes a resiliently deformable torque transmitting element 24 connecting the regions 20, 22. When the unit 12 transmits torque, the element 24 is resiliently twisted resulting in the first and second regions 20, 22 being angularly displaced about the axis 14 with respect to each other by an amount which depends upon the amount of torque transmitted.

Figure 2:
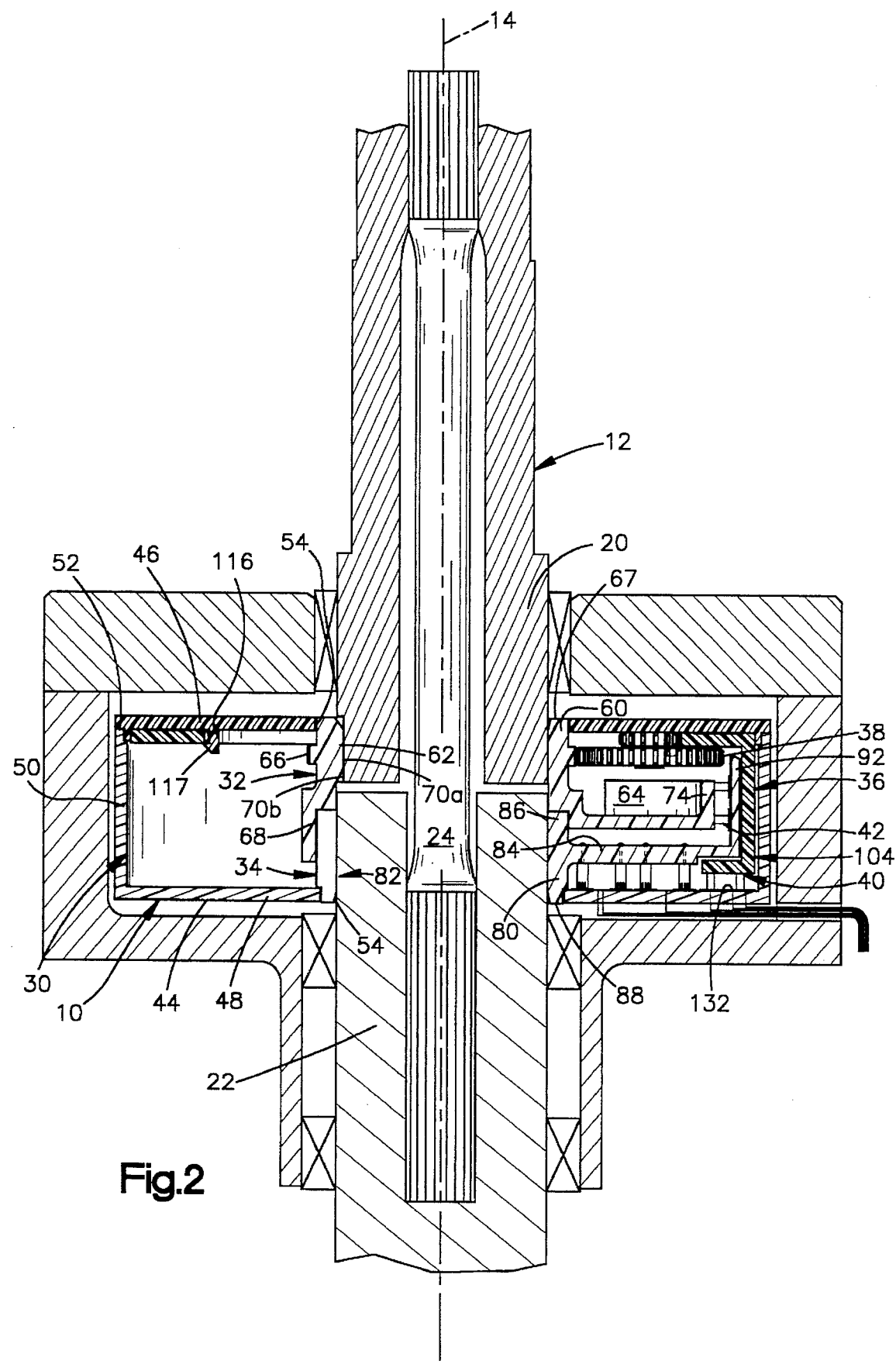
FIG. 2 is a cross-sectional view of an angular displacement signalling device constructed according to the invention.

The element 24 has adequate strength to transmit any reasonably expectable torque between the first and second regions 20, 22. The element 24 can take any suitable form. In FIG. 1, the element 24 is schematically shown as integral with one of the regions 20, 22 and keyed to the other region. In FIG. 2 the element 24 is shown as a pin-like structure connected at its respective ends to regions 20, 22, respectively, formed on coaxial torsion transmitting shafts. The element 24 is illustrated as fixed to the respective shafts by splines.

The signalling device 10 produces first and second electrical output signals having respective values indicating angular displacement of the shafts relative to the axis and torque transmission. The device 10 comprises a housing 30 disposed about, and fixed with respect to, the axis 14, first and second rotors 32, 34 each fixed to a respective one of the first and second regions 20, 22 for rotation about the axis 14, an output member 36 supported for movement with respect to the housing and the first and second rotors, a drive transmission 38 for transmitting drive between the output member 36 and the first rotor 32 and first and second angular displacement signal generators 40, 42. The signal generators 40, 42 produce respective angular displacement signals representing 1) the angular displacement of one of the first and second rotors relative to the housing (shaft angular displacement); and 2) the angular displacement between the first and second rotors (torque transmission).

The preferred and illustrated housing 30 is constructed and arranged to enable the various components of the device 10 to be shipped and handled as a unit as well as assembled as a unitary structure to the unit 12. The housing 30 defines a chamber for receiving and surrounding the rotors 30, 32, the output member 36, the drive transmission 38, and the signal generators, 40, 42. The housing comprises a cup-like body 44 receiving the device components and a cover 46 which fits over the open end of the body 44 to close the chamber formed by the housing. The body 44 comprises a generally annular base wall 48 and a cylindrical sidewall 50 extending from the base wall 48 to a cover engaging lip 52.

The cover 46 is pressed into engagement with the lip 52 and secured in place by ultrasonic welding, adhesive bonding material or other suitable means to complete assembly of the device 10. The cover 46 and base wall 48 are generally planar annular elements centered on the axis 14 and having aligned central openings 54 through which the torque transmitting unit 12 extends. The illustrated housing 30 is so constructed and arranged that in operation it is fixed with respect to the rotors and other moving elements of the device 10 located within it. For this purpose the housing body 44 is constructed so that it can be securely supported within a surrounding shaft unit supporting casting, support frame, or the like, by the use of fasteners, keys, adhesives, etc. none of which is illustrated in the drawings.

The rotor 32 is fixed to the shaft region 20 for rotation within the housing 30. The rotor 32 comprises an annular rotor body 60, a shaft locking structure 62 securing the rotor body to the shaft region 20, a signal generator support 64 projecting from the body 60, and a drive connection 66 coacting with the drive transmission 38.

The rotor body 60 is a generally cylindrical member extending axially along the region 20 in the direction of the axis 14. The body 60 is illustrated as formed from a relatively rigid, high-strength molded plastic material. One axial end face 67 is surrounded by and projects through the adjacent housing cover opening 54. The opposite axial end 68 projects beyond the region 20 and is disposed adjacent the rotor 34.

The shaft locking structure 62 accurately aligns and positively positions the body 60 on the shaft region 20. The locking structure 62 and the shaft region 20 are provided with conforming interlocking peripheral structures which ensure accurate angular alignment between the shaft region 20 and the rotor body 60. In the illustrated embodiment, the interlocking peripheral structures are flat planar faces 70a, 70b formed, respectively, on the rotor body interior periphery and on the external periphery of the region 20. These peripheries thus each resemble the capital letter "D" in cross section.

The illustrated body 60 carries circumferentially spaced key-like projections 72 along its inner periphery. The projections 72 are yieldable and at least somewhat resilient so that forcing the rotor body 60 onto the shaft region 20 resiliently crushes the projections 72 providing a strong frictional grip which anchors the body 60 against axial shifting relative to the shaft region 20.

Figure 3:
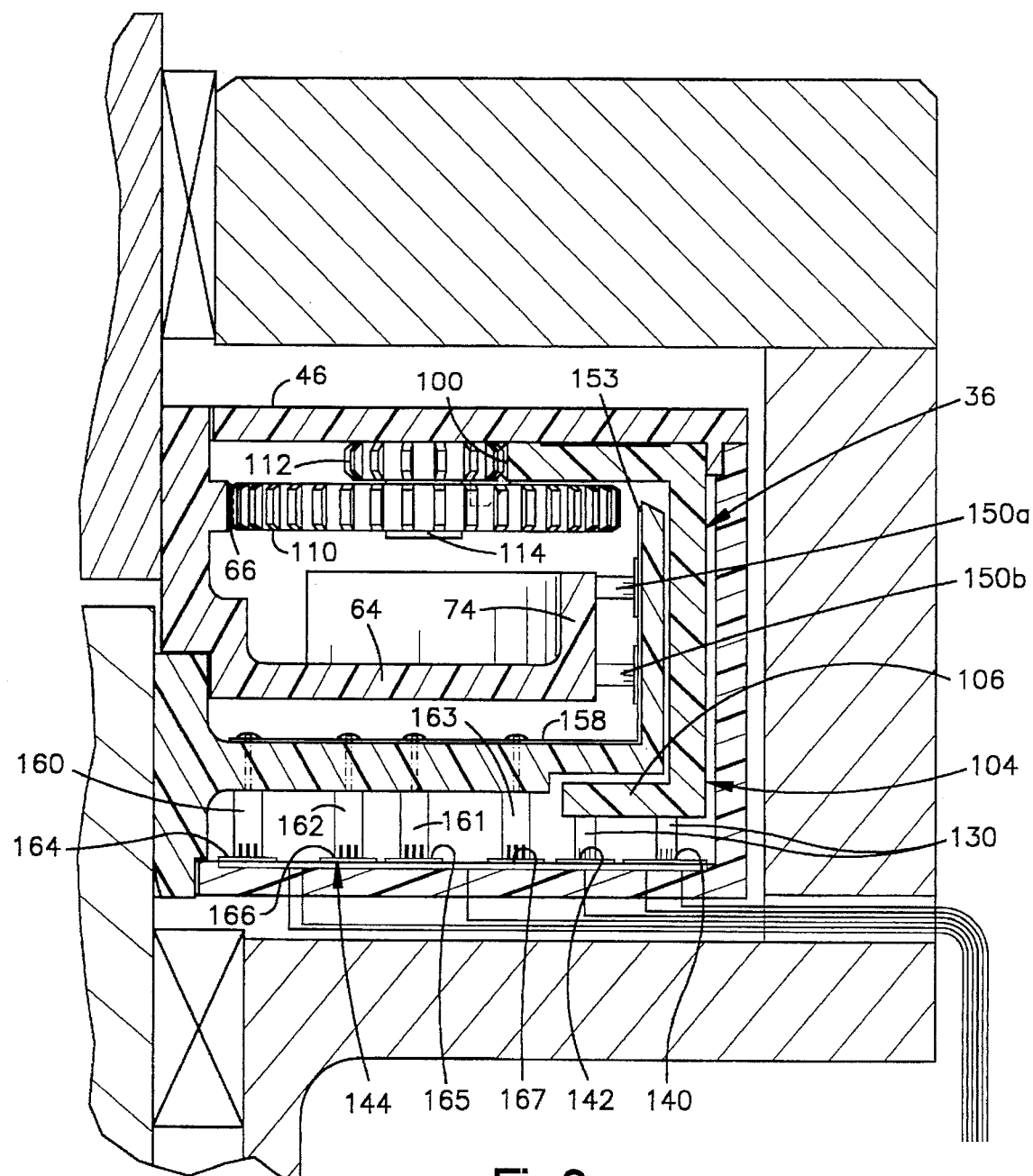
FIG. 3 is an enlarged fragmentary view of part of FIG. 2.

The signal generator support 64 in the embodiment of the invention illustrated by FIGS. 2 and 3 is a generally sector-shaped arm extending radially outwardly from the rotor body 60 and carrying a generally semi-cylindrical flange 74 at its radially outer periphery. The flange 74 carries an element of the signal generator 42. As the rotor 32 rotates about the axis 14 the signal generator element carried by the flange 74 rotates about the axis 14. The flange 74 is concentric about the axis 14 and located remote from the body 60 so that a relatively small angular displacement of the body 60 about the axis 14 creates a relatively large flange and signal generator element movement.

The drive connection 66 transfers motion from the rotor body 60 to the transmission 38 so that the output member 36 is positively driven upon motion of the rotor body 60 about the axis 14. In the illustrated embodiment of the invention, the drive connection 66 is formed by a sun gear having its teeth molded into the exterior surface of the body 60. The illustrated transmission 38 is formed by a gear train between the output member 36 and the rotor 32. While a toothed gear arrangement is illustrated in the drawings, other forms of transmission and drive connection could be provided such as a chain drive, or a timing belt drive, or some other form of gearing. Any non-slipping drive transmission between the rotor 32 and the output member 36 can be employed, to the extent practical.

The second rotor 34 is fixed to the shaft unit 22 for rotation with the unit 22 about the axis 14. The rotor 34 comprises an annular rotor body 80, a shaft locking structure 82 which fixedly secures the rotor body 80 to the shaft region 22 and a signal generator support 84 projecting from the rotor body 80 radially away from the axis 14.

The rotor body 80 is an annular, generally cylindrical member having one end 86 disposed closely adjacent the end 68 of the rotor body 60 and an opposite axially end 88 projecting through the adjacent central housing body opening 54. The axial rotor body end 88 is substantially flush with the plane of the housing base wall 48. The inner periphery of the opening 54 is spaced slightly radially away from the outer periphery of the rotor body end 88. The rotor body 80 is thus capable of rotation relative to the housing 30 as well as relative to the rotor body 60 since these elements, although closely spaced, normally do not contact each other. In the preferred device the rotor body end 68 forms a socket-like structure telescoped over the rotor body end 86.

The shaft locking structure 82 precisely aligns the rotor body 80 radially with respect to the shaft region 22 as well as securing the rotor body 80 to the shaft region against radial or axial movements, as described in reference to the rotor body 60 and the shaft region 20. The construction and arrangement of the shaft locking structure 82 is identical to the structure 62. Reference should be made to the previous description for understanding the structure 82.

The signal generator support 84 is formed by a sector-shaped arm projecting radially outwardly from the rotor body 80 and terminating in a cylindrical flange 92. The flange 92 is concentric about the axis 14 and extends parallel to and closely about the flange 74 on the rotor body 60. The flange 92 carries an element of the signal generator 42. The rotor bodies 80, 60 rotate relative to each other when torque transmitted by the unit 12 deflects the torsion element 24. Relative rotation between the rotor bodies creates relative angular movement between the flanges 74, 92. When the signal generator elements move relative to each other, an output signal is produced which varies according to displacement of the signal generator elements they carry. Accordingly the signal generator 42 produces a signal having a value which depends upon the degree of torque transmitted by the unit 12.

The illustrated and preferred output member 36 is driven from the rotor 32 for operating the signal generator 40 to produce an output signal whose value varies depending upon the rotational position of the rotor 32 relative to the housing 30. In other words, the output member 36 and signal generator 40 produce an output indicative of the angular position of the shaft region 20 about the axis 14. The preferred output member 36 is a generally flat annular molded plastic member having an inner periphery defining a ring gear 100 and an outer periphery carrying a signal generator support 104. The illustrated support 104 projects axially from the plane of the member 36 to a location adjacent the housing base wall 48. The axially projecting end of the support 104 carries a generally radially extending flange 106 which supports an element of the displacement signal generator 40 in position adjacent the housing base wall 48.

In the preferred device 10 the output member 36 and the transmission 38 are assembled to the housing cover to form a subassembly which is then assembled to the remaining components of the device. The drive transmission 38 is formed by a pinion gear assembly running in mesh with the sun gear 66 and the ring gear 100. The pinion gear assembly comprises a large diameter pinion gear 110 meshed with the sun gear and a smaller diameter pinion gear 112 fixed to the pinion gear 110 and meshed with the ring gear 100. The gears 110, 112 are supported for rotation about a common axis on a stub shaft 114 projecting from and integrally formed with the housing cover 46. The shaft 114 extends through the pinion gear central bores along their axis of rotation. The projecting stub shaft end is peened over after the pinion gears are mounted on it to secure the pinion gears in place to the housing cover. The pinion gear assembly thus aids in supporting the output member 36 relative to the housing cover.

In addition to being supported by the pinion gear assembly the output member 36 is supported on the housing cover by support fingers 116 (only one of which is illustrated) which latch the member 36 in place radially with respect to the axis 14 while enabling the member 36 to freely rotate about the axis 14. The latching fingers 116 are molded integrally with the housing cover 46 in a circumferentially extending array. Each finger 116 is resiliently flexible and provided with a cam and barb-like keeper structure 117 at its projecting end. See FIG. 2. The keeper structure captures the member 36 when the output member is pressed onto the housing cover.

The pinion gear assembly is constructed and arranged such that a gear reduction of about 4:1 is realized between the rotor body 60 and the output member 36. In the illustrated and preferred embodiment of the invention the gear reduction provided is such that 4.2 revolutions of the shaft region 20 about the axis 14 results in the output member 36 revolving 350° about the axis 14.

The angular displacement signal generator 40 is constructed and arranged to produce an electrical output signal having a value which varies depending upon the angular displacement of the shaft region 20 relative to the housing 30 through multiple shaft revolutions. The shaft region 20 makes about 4.2 revolutions about the axis 14 while producing output signals from the generator 40 varying throughout a predetermined range of signal values. A given output signal value thus corresponds to a predetermined shaft position.

The signal generator 40 comprises a first signal generator element 130 carried by the output member 36 and a second element 132 carried by the housing 30. When the output member 36 is driven about the axis 14 the elements 130, 132 are moved relative to each other resulting in the generation of the output signal. The elements 130, 132 are constructed and arranged so that relative motion between them changes electrical parameters which in turn alter the output signal value.

The element 130 is preferably a U-shaped wiper formed from a thin strip of highly conductive spring material. The legs of the "U" project toward the housing base wall 48. The bight of the U-shaped element is securely fixed to the flange 106, for example by rivetting, ultrasonic welding, or the like, so that the wiper leg positions are accurately maintained relative to the output member 36.

The element 132 is formed by parallel strips 140, 142 of electrical resistance material deposited on concentric circularly curved paths on a thick film body 144. The film body is formed by an annular non-conducting pliant plastic sheet which is adhered or otherwise fixedly secured in place to the housing base wall 48. The resistive strips 140, 142 are deposited on the film 144 at locations which are, and remain, aligned with the respective associated wiper leg. The illustrated film has the resistive strips deposited along the outer film peripheral portion so that the actual length of the deposited strip material from end to end is maximized.

Adjacent ends of the resistive strips 140, 142 are attached to conductors printed on the film 144 and extending along the opposite side of the thick film 144 to terminals from which the signal is delivered from the housing via insulated leads.

As the shaft region 20 rotates from one of its extreme positions with respect to the housing 30, the signal element 130 is shifted from a limit position with respect to the resistive strips 140, 142 toward the opposite strip ends. The position signal value produced by the signal generator 40 increases as the length of resistive strip in the signal circuitry is reduced. Shaft region rotation in the opposite direction produces a decreasing position signal value. In the preferred and illustrated embodiment of the invention the resistive strip ends electrically contact respective insulated leads which are supported by the housing 30 and extend away from the housing to a suitable signal processor (not illustrated).

The signal generator 42 is formed by a signal producing element 150 carried by the flange 74 on the rotor body 60 and a signal producing element 152 carried by the flange 92 on the rotor body 80. In the preferred and illustrated embodiment the signal producing element 150 is actually formed by two separate wipers 150a, 150b while the element 152 is formed by a thick film sheet 153 carrying strips, or pads, 154, 155, 156, 157 of resistive material deposited thereon. The film 155 in turn is fixed to the flange 92 in registration with the wipers 150a, 150b.

The wipers 150a, 150b are identical, each being formed by single elongated strip of copper alloy or other highly conductive spring metal. Each wiper defines a central section fixedly secured to the flange 74 and oppositely extending fingers defining tips urged into wiping electrical contact with a respective resistive strip on the film 153.

The rotor bodies 60, 80 move relative to each other in response to changes in torque transmitted by the shaft unit 12. The wipers 150a, 150b shift circumferentially relative to the respective associated resistive strips 154, 155, 156, 157. Each wiper 150a, 150b bridges two resistive strips. The bridged resistive strips are connected across an output signal circuit so that as the associated wiper moves relative to the bridged resistive strips, the signal circuit resistance increases or decreases depending on the direction and extent of the relative movement. In the illustrated device 10 two electrically distinct, but complimentary, output signals are produced by the signal generator 42. The rotor bodies 60, 80 can be displaced relative to each other through a 4° shift when the torque transmitted by the shaft unit 12 varies from zero (0) to the torque level required to produce a maximum torque signal value in one direction or the other. Accordingly, the total range of relative motion between the rotor bodies 60, 80 is 8° and the output signals vary throughout their entire ranges as the shafts move relatively through the 8° range.

Figure 4:
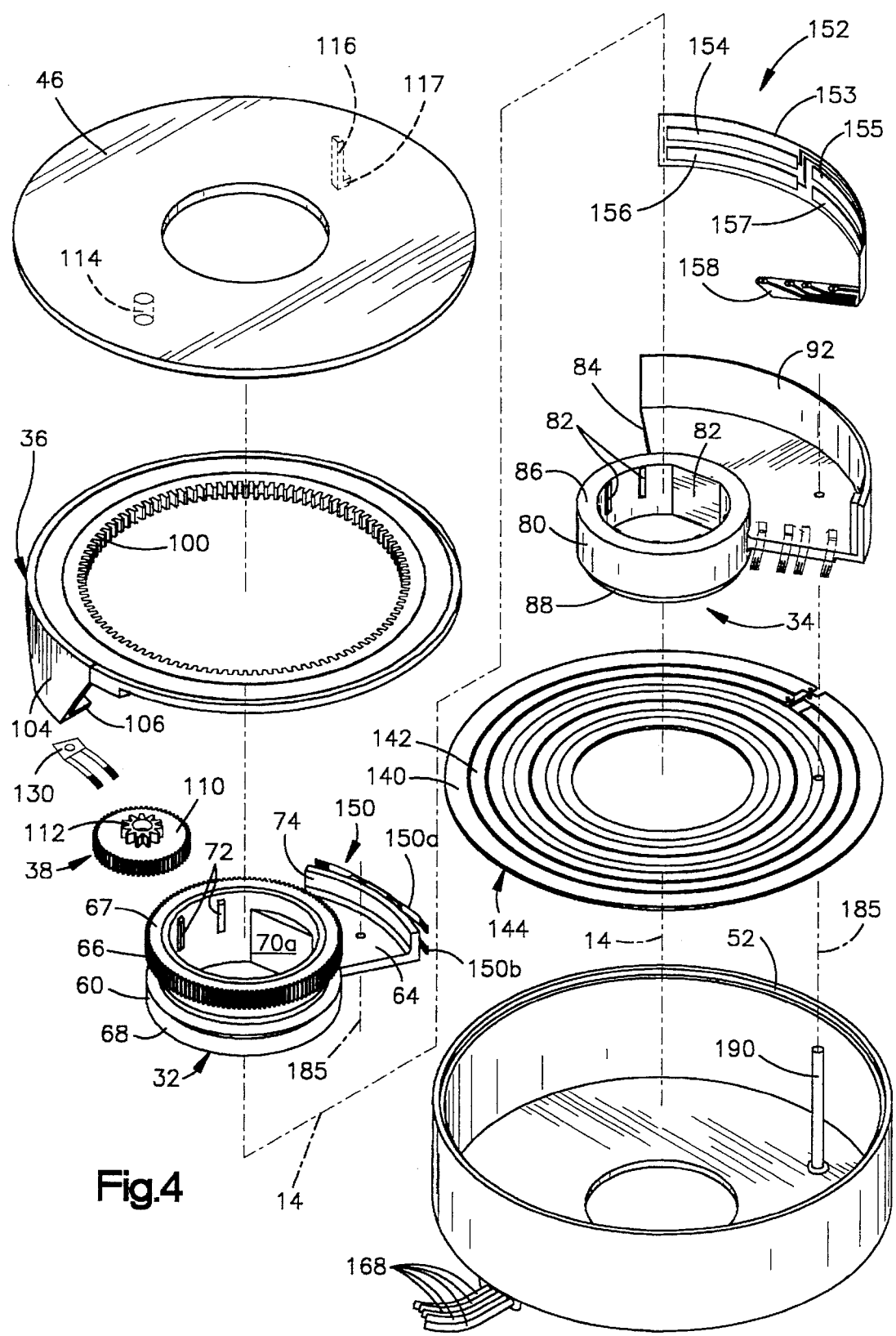
FIG. 4 is an exploded perspective view of the angular displacement signalling device illustrated by FIG. 2.

In the illustrated device 10, the torque responsive output signals from the generator 42 are transmitted from the housing 30 via slip rings and brushes. As best seen in FIG. 4, the film 152 carries a projecting tab section 158 carrying deposited torque signal conductors and terminal pads associated with the respective resistive strips 154–157. Each terminal pad is electrically connected to a respective brush 160–163 fixed to the sector shaped support arm 84. Each brush is formed by a highly conductive copper alloy spring projecting from the support arm 84 to the film 144 on the housing base wall. The film 144 supports concentric annular conductive strips 164–167, each aligned with a respective brush 160–163 for conducting the torque signals along the housing base wall and to a suitable remote signal processor via insulated leads 168 (FIG. 4). The leads 168 are attached to respective terminal pads of the strips 164–167.

An important feature of the invention resides in the construction of the new signalling device as a precalibrated module suited for quick, easy assembly to a shaft unit, or the like, so that device calibration is not required after assembly. In the preferred embodiment the device 10 is assembled with the rotors 32, 34 nested together in the housing body 44 and the output member 36 and transmission 38 carried by the housing cover 46. The housing body 44 and contents are placed in a fixture and the cover 46 and associated parts are fitted onto the body 44, etc. The resistance across the angular displacement signal leads is measured to determine proper positioning of the rotors 32, 34. The rotors are accurately aligned in predetermined positions corresponding to a known shaft unit position which will exist when the shaft unit and the device 10 are assembled together at a later time. The cover 46 is then welded or bonded in place. After fabricating, the device 10 can be handled, transported and later installed on a shaft unit without any change in alignment of the device parts occurring.

In the illustrated embodiment, structure for temporarily securing the rotors and housing parts in place relative to each other is provided. The rotors and the housing parts are each formed with a hole located for radial alignment about the axis 14 with corresponding holes in the other parts. When the device 10 has been assembled, the holes are aligned on a common axis 185 (see FIG. 4) by rotating one of the rotors. The device parts remain essentially in their predetermined relative positions. In the illustrated embodiment the securing structure comprises a removable pin 190 inserted through the holes along the axis 185 and secured in place to the device 10.

The device 10 is subsequently assembled to a shaft unit 12 as a unitary precalibrated component. Preferably the device 10 is initially assembled to the shaft region 22. The device 10 is oriented with respect to the shaft region so that the flat engaging surfaces on the shaft region 22 and the interior periphery of the rotor 34 are aligned. A pressing tool (not shown) engages the outwardly facing end 67 of the rotor body 60 and forces the device 10 onto the shaft region 22. The rotor body 60 engages and transmits the mounting force directly to the rotor body 80 so the housing components and other elements of the device 10 are not over-stressed.

Installation is completed by attaching the torque transmitting element 24 and the second shaft region 22 to the first shaft region. The second shaft region is aligned with the rotor body 60 so that the conforming flat surfaces on the rotor body and the shaft region are aligned when the second shaft region is angularly related properly to the first shaft region. The second shaft region 22 is then pressed into the rotor body 60. The slightly resilient nature of the shaft locking structures, 62, 82 not only frictionally secures the rotor bodies in place but also provides for a limited degree of "spring back" away from the direction of pressing motion so that a slight clearance between the rotor bodies 60, 80 exists after installation of the device 10.

The pin 190 is next removed to free the internal device components 10 for relative movement. Because the device components are accurately aligned with each other before installation and since the shaft regions 22, 24 are properly aligned with the rotor bodies 60, 80 during installation, further calibration is not necessary. It should be noted that the pin 190 and aligned holes may be replaced by adhesive tape for temporarily securing the rotors together after calibration. The tape is applied to the inner peripheries of the rotors to prevent relative rotation before the device 10 is assembled to the shaft regions. The tape is removed just before placing the device on the shaft region. It is also possible that shear pins or other frangible connectors might be employed for the same purpose.

The housing 30 can be fixed with respect to the unit 12 by any suitable structure. For example, the housing can be formed with spine-like projections interfitting with conforming recesses in a shaft unit supporting bearing housing, or can be keyed in place to such a housing. Any suitable form of attachment for securing the housing 30 against motion relative to the axis 14 can be employed.

While a single preferred construction of a signalling device embodying the present invention has been illustrated and described in considerable detail the present invention is not to be considered limited to the precise construction disclosed. Various adaptations, modifications and uses of the invention may occur to those skilled in the art to which the invention relates. The intention is to cover hereby all such adaptations, modifications and uses which fall within the spirit or scope of the appended claims.

I claim:

1. An angular displacement signalling device comprising:
   a housing disposed about an axis;
   a shaft unit extending through said housing rotatable with respect to said housing about said axis, said shaft unit comprising first and second shaft regions spaced axially apart along said shaft unit, said shaft unit resiliently deformed in response to torque transmitted by said shaft unit to angularly displace one of said shaft regions relative to the other by an amount related to the torque being transmitted;
   a first rotor fixed to said first shaft region for rotation with said first shaft region relative to said housing and said second shaft region;
   a second rotor fixed to said second shaft region for rotation with said second shaft region relative to said housing and said first shaft region;
   an output member supported for movement with respect to said housing and said first and second rotors;
   a transmission for transmitting drive between said output member and said first rotor, said transmission reacting so that said movement of said output member bears a predetermined relationship with movement of said first rotor;
   a first angular displacement signal generator comprising a first signal element fixed with respect to said output member and a second signal element fixed with respect to said housing, said signal elements coupled together and relatively movable to produce a first angular displacement signal whose value changes in relation to the extent of relative angular movement between one of said first and second rotors and said housing; and,
   a second angular displacement signal generator comprising third and fourth signal elements coupled together to produce a second angular displacement signal having a value which varies in relation to the angular displacement between said first and second rotors.

2. An angular displacement signalling device constructed for association with a torque transmitting unit rotatable about an axis, said unit comprising first and second unit regions spaced axially apart along said unit, said unit resiliently deformed in response to torque transmitted by said unit to angularly displace one of said regions relative to the other by an amount related to the torque being transmitted, the signalling device comprising:

a housing disposed about said axis;

a first rotor fixed to said first region for rotation with said first region relative to said housing and said second region;

a second rotor fixed to said second region for rotation with said second region relative to said housing and said first region;

an output member supported for movement with respect to said housing and said first and second rotors;

a transmission for transmitting drive between said output member and said first rotor, said transmission reacting so that said movement of said output member bears a predetermined relationship with movement of said first rotor;

a first angular displacement signal generator comprising a first signal element fixed with respect to said output member and a second signal element fixed with respect to said housing, said signal elements coupled together and relatively movable to produce a first angular displacement signal whose value changes in relation to the extent of relative angular movement between one of said first and second rotors and said housing; and, a second angular displacement signal generator comprising third and fourth signal elements coupled together to produce a second angular displacement signal having a value which varies in relation to the angular displacement between said first and second rotors.

3. A device for producing electrical output signals indicative of angular displacement comprising:

a. a housing defining a chamber surrounding a rotation axis, said axis extending through a housing opening;

b. a member disposed in said chamber for rotation about said axis relative to said housing, said member having a support arm radially spaced from said axis;

c. a signal generator comprising a first signal generating element carried by said support arm for rotation about said axis with said member and a second signal generating element supported within said chamber, said first and second signal generating elements relatively movable about said axis to produce an electrical output signal having a value which varies in relation to the extent of relative movement between said elements; and, d. structure temporarily securing said member to said housing in a predetermined position fixed against rotation about said axis, said securing structure comprising a portion effective to fix said first and second signal generating elements in predetermined positions relative to each other.

4. A method of fabricating a device for signalling angular displacement comprising:

a. providing a housing defining a chamber surrounding an axis with spaced housing openings disposed about said axis;

b. supporting first and second rotor members in said housing for rotation about said axis, each rotor member defining opposite ends and a bore therethrough defining an opening in said ends, each rotor member defining at least one end surface;

c. aligning said rotor member bores along said axis, with opposite rotor member end surfaces surrounded by respective housing openings and adjacent rotor member ends disposed for abutting contact;

d. stationing first and second electrical signal generators in said housing, said first signal generator producing signal values varying in direct relation to the angular displacement between one of said rotor members and said housing and said second signal generator producing signals varying in direct relationship to angular displacement between said first and second rotor members;

e. securing one of said rotor members and one shaft region together by forcing said one shaft region into the bore of said one rotor member; and, f. moving a second shaft region into the bore of the other rotor member for securing said second shaft region and said other rotor member.

5. An angular displacement signalling device comprising:

a. a housing disposed about an axis;

b. a shaft unit extending through said housing rotatable with respect to said housing about said axis, said shaft unit comprising first and second shaft regions spaced axially apart along said shaft unit, said shaft unit being resiliently deformed in response to torque transmitted by said shaft unit to angularly displace one of said shaft regions relative to the other by an amount related to the torque being transmitted;

c. a first rotor disposed within said housing and fixed to said first shaft region for rotation with said first shaft region relative to said housing and said second shaft region;

d. a second rotor disposed within said housing and fixed to said second shaft region for rotation with said second shaft region relative to said housing and said first shaft region;

e. a first angular displacement signal generator comprising a first signal element connected to one of said rotors and a second signal element connected to said housing, said first and second signal elements being coupled together and relatively movable to produce a first angular displacement signal whose value changes in relation to the extent of relative angular movement between said one of said first and second rotors and said housing; and, f. a second angular displacement signal generator comprising third and fourth signal elements being coupled together to produce a second angular displacement signal having a value width varies in relation to the angular displacement between said first and second rotors.

* * * * *